United States Patent [19]

Tanaka

[11] Patent Number: 5,757,764
[45] Date of Patent: May 26, 1998

[54] DISC CARTRIDGE HAVING A WRITE PROTECT OPERATING PORTION DISPOSED WITHIN THE CARTRIDGE BODY

[75] Inventor: Satoshi Tanaka, Yokohama, Japan

[73] Assignee: Kabushiki Kaisha Toshiba, Kawasaki, Japan

[21] Appl. No.: 729,406

[22] Filed: Oct. 11, 1996

[30] Foreign Application Priority Data

Oct. 13, 1995 [JP] Japan ................................. 7-265855

[51] Int. Cl.$^6$ ............................................... G11B 23/03
[52] U.S. Cl. ........................................ 369/291; 360/133
[58] Field of Search ................. 369/291; 360/97.01, 360/133

[56] References Cited

U.S. PATENT DOCUMENTS

| | | | |
|---|---|---|---|
| 5,293,293 | 3/1994 | Iwata et al. | 369/291 |
| 5,325,256 | 6/1994 | Miyazaki | 360/132 |
| 5,381,402 | 1/1995 | Lee et al. | 369/291 |
| 5,579,297 | 11/1996 | Childers et al. | 369/291 |
| 5,581,540 | 12/1996 | Dang | 369/291 |

FOREIGN PATENT DOCUMENTS

| | | |
|---|---|---|
| 335 461 | 4/1989 | European Pat. Off. . |
| 332 214 | 9/1989 | European Pat. Off. . |
| 368 347 | 5/1990 | European Pat. Off. . |
| 421 775 A2 | 4/1991 | European Pat. Off. . |
| 657 885 A2 | 6/1995 | European Pat. Off. . |

*Primary Examiner*—Jefferson Evans
*Attorney, Agent, or Firm*—Cushman Darby & Cushman IP Group of Pillsbury Madison & Sutro LLP

[57] ABSTRACT

A cartridge body of a disc cartridge includes a disc inlet/outlet port for insertion and removal of an optical disc. A lid is mounted on the cartridge body and rotatable between a closed position wherein the lid closed the disc inlet/outlet port and an opened position wherein the lid opens the disc inlet/outlet port. The lid includes a write protect operating portion for controlling operation of recording information onto the recording medium. The write protect operating portion is arrange to be disposed inside the cartridge body and operable from outside the cartridge body while the lid is in the closed position.

7 Claims, 11 Drawing Sheets

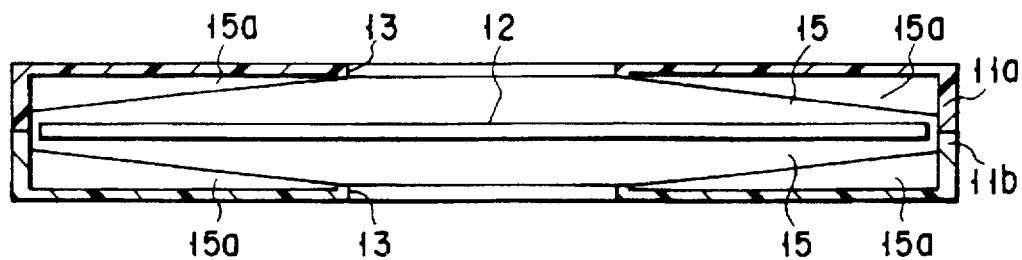
F I G. 4
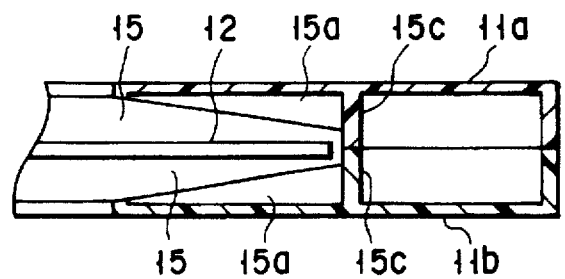
F I G. 5
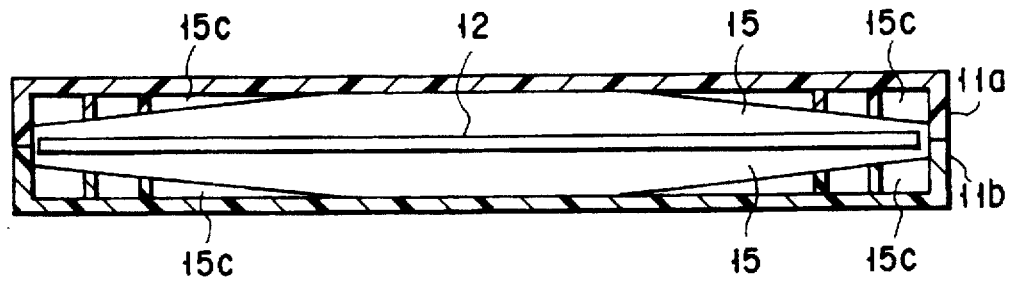
F I G. 6

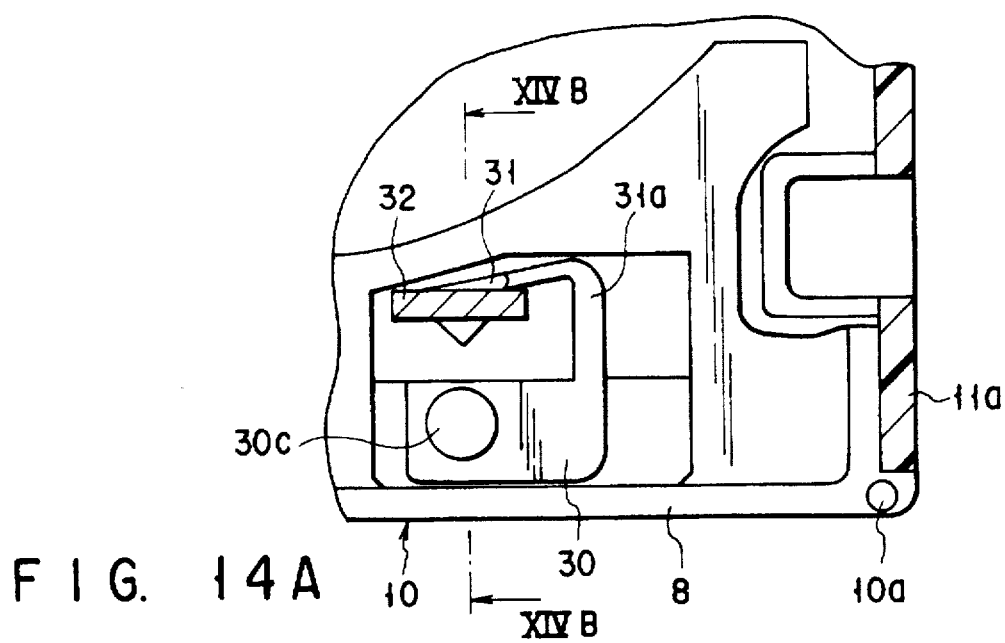
F I G. 14A
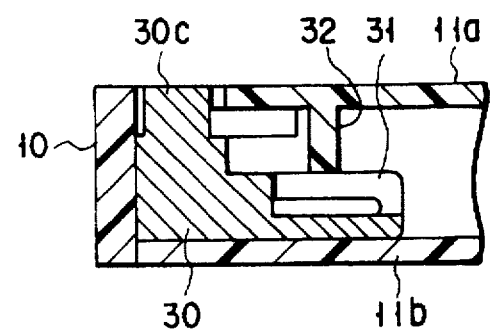
F I G. 14B
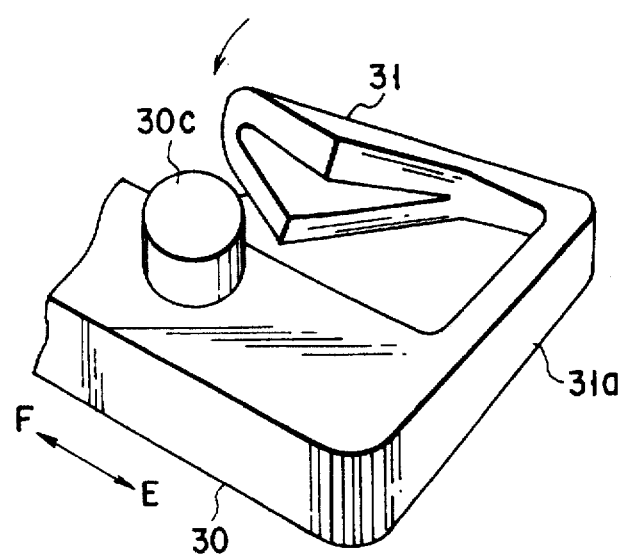
F I G. 15

DISC CARTRIDGE HAVING A WRITE PROTECT OPERATING PORTION DISPOSED WITHIN THE CARTRIDGE BODY

BACKGROUND OF THE INVENTION

1. Field of the Invention

The present invention relates to a disc cartridge which contains a disc-like recording medium such as an optical disc, magneto-optical disc, a magnetic disc or the like and which has an opening section for allowing access to the recording medium to record and/or reproduce an information signal.

2. Description of the Related Art

Conventionally, this kind of disc cartridge comprises a flat rectangular cartridge body consisting of an upper case and a lower case coupled with each other, and a disc, such as an optical disc, or an magnetic in the cartridge body. Each of the upper and lower cases has openings for exposing that region of the disc which extends from the center portion of the disc to the outer peripheral portion. A pick-up and a turn-table of a recording and reproduction device for rotating the disc access the disc through the openings. In addition, the cartridge body is equipped with a slidable shutter made of a thin metal plate or hard synthetic resin for closing and opening the openings.

On each of the outer surfaces of the cases is formed a concave label adhering portion recessed from the other portions of the surface and an indication label for indicating the contents of the disc is adhered on to each of the label adhering portions.

When a disc cartridge having the above-mentioned structure is loaded into a disc recording and reproduction device, the shutter is slid at first to an end side of the cartridge body by a shutter opening and closing means, thereby opening the openings. Subsequently, a turn-table is inserted into the cartridge body through one of the openings to support the disc and a pick-up faces the surface of the disc through the opening portion. In this state, the disc is rotated by the turn-table, and recording and/or reproduction is performed on the disc by the pick-up.

In this kind of disc cartridge, the disc is contained in the cartridge body and the openings are closed by the shutter when the disc cartridge is not used, thus realizing safe disc storing. In addition, since the shutter is slid so that the disc in the cartridge body is exposed through the openings to enable recording and reproduction, permanent use of the disc is realized.

In the disc cartridge having the structure as described above, however, the disc is protected and will realize long life-time but the disc can cannot be taken out of the cartridge body. Because the disc cannot be removed from the cartridge, it is difficult to directly load the disc itself to a disc recording/reproducing device, for example. This kind of disc cartridge, thus, has severe limitations with respect to the degree of freedom in disc use.

Particularly, in recent years, there has been requests for a disc cartridge applicable to both of a disc recording/reproducing device which is used with one disc singly loaded thereto, and a disc recording/ reproducing device which is used with the entire disc cartridge loaded thereto.

SUMMARY OF THE INVENTION

The present invention has been made in view of the above situation and has its object to provide a disc cartridge which is improved in the degree of freedom in use of a disc. The disc cartridge of the present invention does not limit the use of the disc to recording/reproducing devices in which the disc cartridge is necessary and also ensures function of the disc cartridge.

In order to achieve the above object, the disc cartridge according to the present invention comprises: a cartridge body for rotatably storing a disc-like recording medium and including an opening for exposing a part of a surface of the recording medium. The cartridge also has a disc inlet/outlet port for removing and inserting the recording medium. A shutter is slidably arranged on the cartridge body for opening and closing the opening. A lid is mounted on the cartridge body and is rotatable between a closed position wherein the lid closes the disc inlet/outlet port and an opened position wherein the lid opens the disc inlet/outlet port.

The lid includes a write protect operating portion for controlling the recording of information onto the recording medium. The write protect operating portion is provided such that the write protect portion can be operated from outside the cartridge body when the lid is in the closed position.

According to the disc cartridge having the structures as described above, the recording medium contained in the cartridge body can be taken out from the disc inlet/outlet port by opening the lid provided with the write protect operating portion. Therefore, while ensuring the write protecting capability of the disc cartridge when the medium is contained in the cartridge body, the recording medium can be removed and used without the disc cartridge.

Also, according to the present invention, the write protect operating portion is guided and positioned by guide means to a predetermined operating position from the position where the write protect operating portion is located in the lid while the lid was molded. In this structure, when the lid is shaped from resin with the use of a metal mold, the precision of the molding of the write protect operating portion can be made relatively low. Thus, it is possible to carry out assembling of the write protect operating portion without a high precision, so that simplified manufacturing is achieved.

Further, the write protect operating portion thus integrally formed with the lid is automatically positioned at the initial operating position by the guide means. Therefore, assembly components can be reduced and a disc cartridge having a simple lid structure can be easily constructed while easy attachment of the lid to the cartridge body is realized.

In addition, according to the present invention, since the lid is of a color different from that of the cartridge body, the direction in which the cartridge body is loaded can be easily identified so that wrong insertion of the cartridge body into a disc recording/reproducing device such as disc drive device or the like can be prevented effectively.

Additional objects and advantages of the invention will be set forth in the description which follows, and in part will be obvious from the description or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a cross-section cut along the line IV—IV of FIG. 2;

FIG. 5 is a cross-section cut along the line V—V of FIG. 2;

FIG. 6 is a cross-section cut along the line VI—VI of FIG. 2;

FIG. 14A is a plan view showing another modification of the opening detect portion;

FIG. 14B is a cross-sectional view showing the opening detect portion according to the another modification;

FIG. 15 is a perspective view showing the write-protect operating portion of the opening detect portion according to the another modification;

DETAILED DESCRIPTION OF THE PREFERRED EMBODIMENTS

An embodiment of the present invention will now be described in detail with reference to the accompanying drawings.

Figure 1:
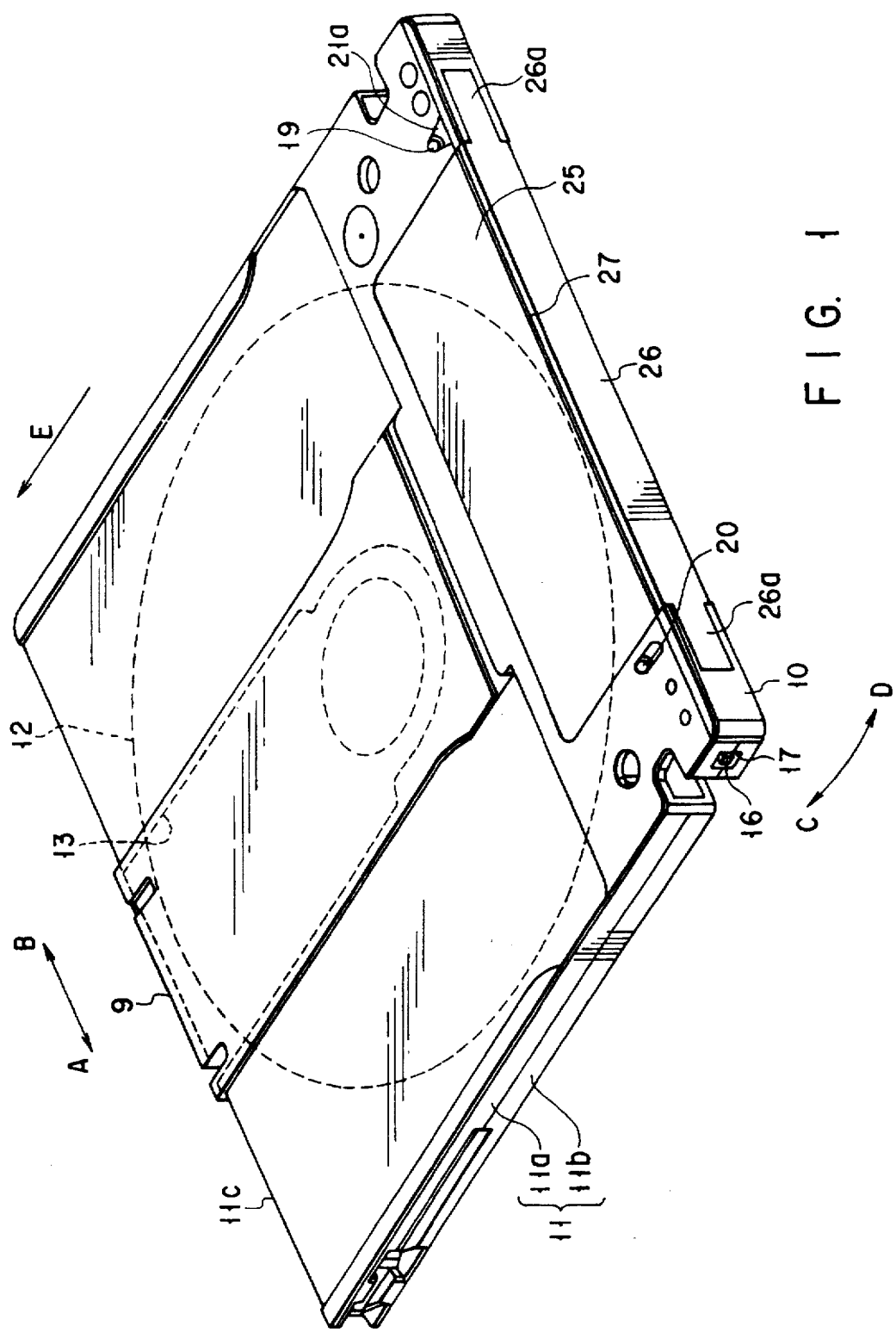
FIG. 1 is a perspective view showing a disc cartridge according to an embodiment of the present invention.
Figure 2:
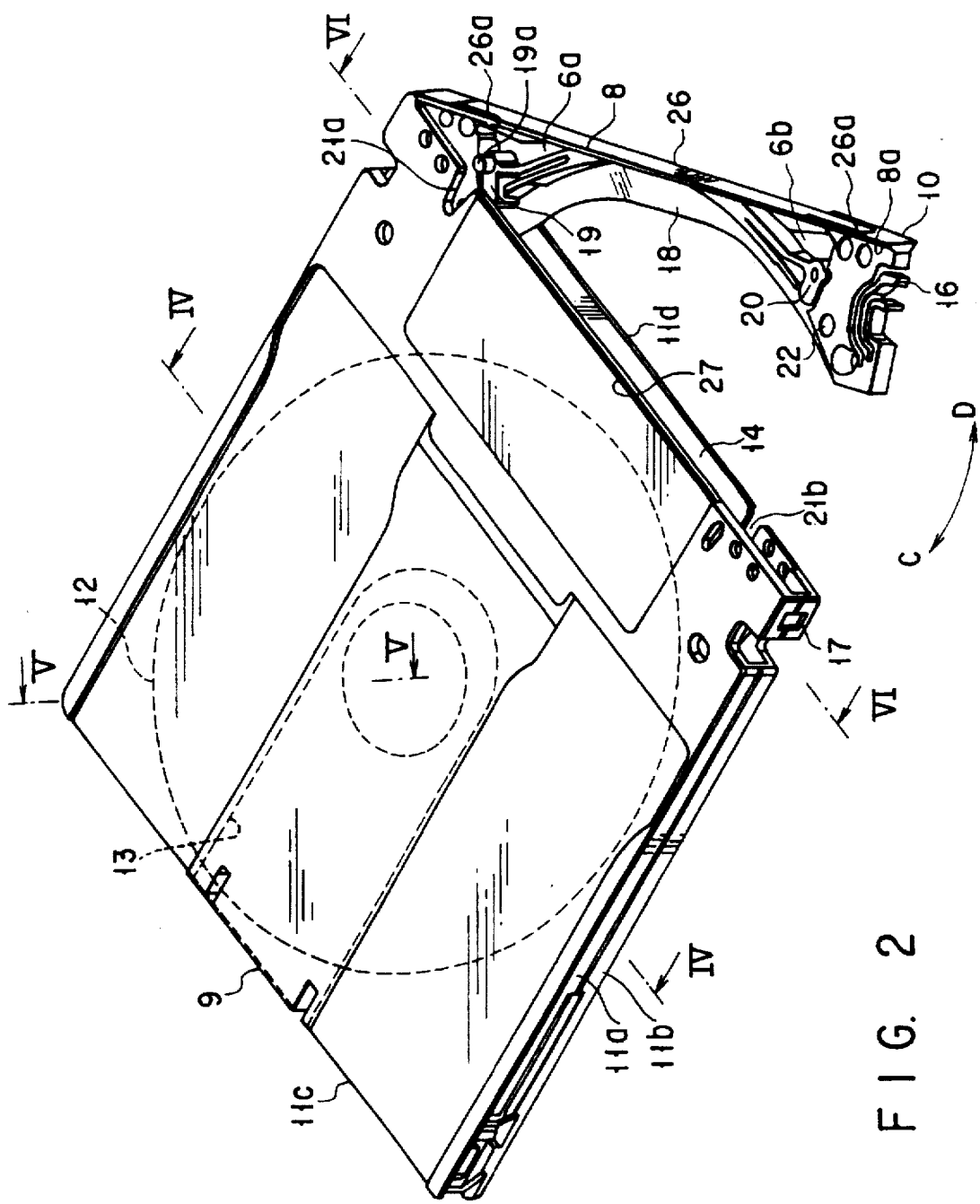
FIG. 2 is a perspective view of the disc cartridge shown in FIG. 1 where its lid is opened.

As shown in FIGS. 1 and 2, a disc cartridge according to the present embodiment, comprises a flat rectangular box-like cartridge body 11 and an optical disc 12 contained rotatably in the cartridge body. The cartridge body includes a pair of main walls (or main surfaces) which face each other and are in parallel with each other and four side walls (or side end surfaces) which are positioned continuously along the side ends of the main walls.

The cartridge body 1 1 includes an upper casing 11a and a lower casing 11b which are formed to be substantially symmetrical to each other and made of synthetic resin such as ABS or the like. These casings are arranged so as to face each other and constitute the cartridge body 11. Further, a disc storing portion 15 which will be described later is defined within the cartridge body 11, and the optical disc is stored in the disc storing portion 15 with a predetermined clearance maintained between the disc surfaces and the inner surfaces of the cartridge body 11. The upper and lower casings 11a and 11b respectively face the surfaces A and B of the optical disc 12.

In addition, an opening 13 is formed in each of the upper and lower casings 11a and 11b. The openings 13 have a predetermined width, extend to the vicinity of the front surface 11c of the cartridge body 11 from the center portions of the casings, and face each other. These openings 13 respectively face the surfaces A and B of the optical disc 12 contained in the cartridge body 11 and expose the optical disc 12 to the outside over the region from the rotational center of the disc 12 to the outer periphery thereof.

The cartridge body 11 is provided with a shutter 9 of a double-side integral type which opens and closes both of the openings 13. The shutter 9 has a substantially U-shaped cross-section and is fitted onto the cartridge body 11 from the front end surface 11c side so as to sandwich both surfaces of the cartridge body 11. As shown in FIGS. 1 and 2, the shutter 9 is slidable between a closed position wherein the shutter closes the openings 13 and two open positions defined in both sides of the closed position wherein the shutter opens the openings 13 in a direction (or direction A-B) parallel to the front end surface 11c of the cartridge body 1 1. Further, the shutter 9 is continuously urged toward the closed position by shutter springs (not shown).

A disc inlet/outlet port 14 for inserting the optical disc 12 into the cartridge body 11 and removing the optical disc 12 is formed in the rear end surface 11d of the cartridge body 11. The disc inlet/outlet port 14 extends over the entire length of the rear end surface 11d. In addition, a lid 10 for opening and closing the inlet/outlet port 14 is rotatably mounted on the cartridge body 11.

Here, supposing that the insert direction in which the disc cartridge is loaded into a disc record/reproduce device (not shown) is indicated by arrow E in FIG. 1, the end surface of the disc cartridge body 11 positioned forwardly with respect to direction E is defined as the front end surface 11C, while the opposite end surface of the disc cartridge body 11 is defined as the rear end surface 11d.

Figure 3:
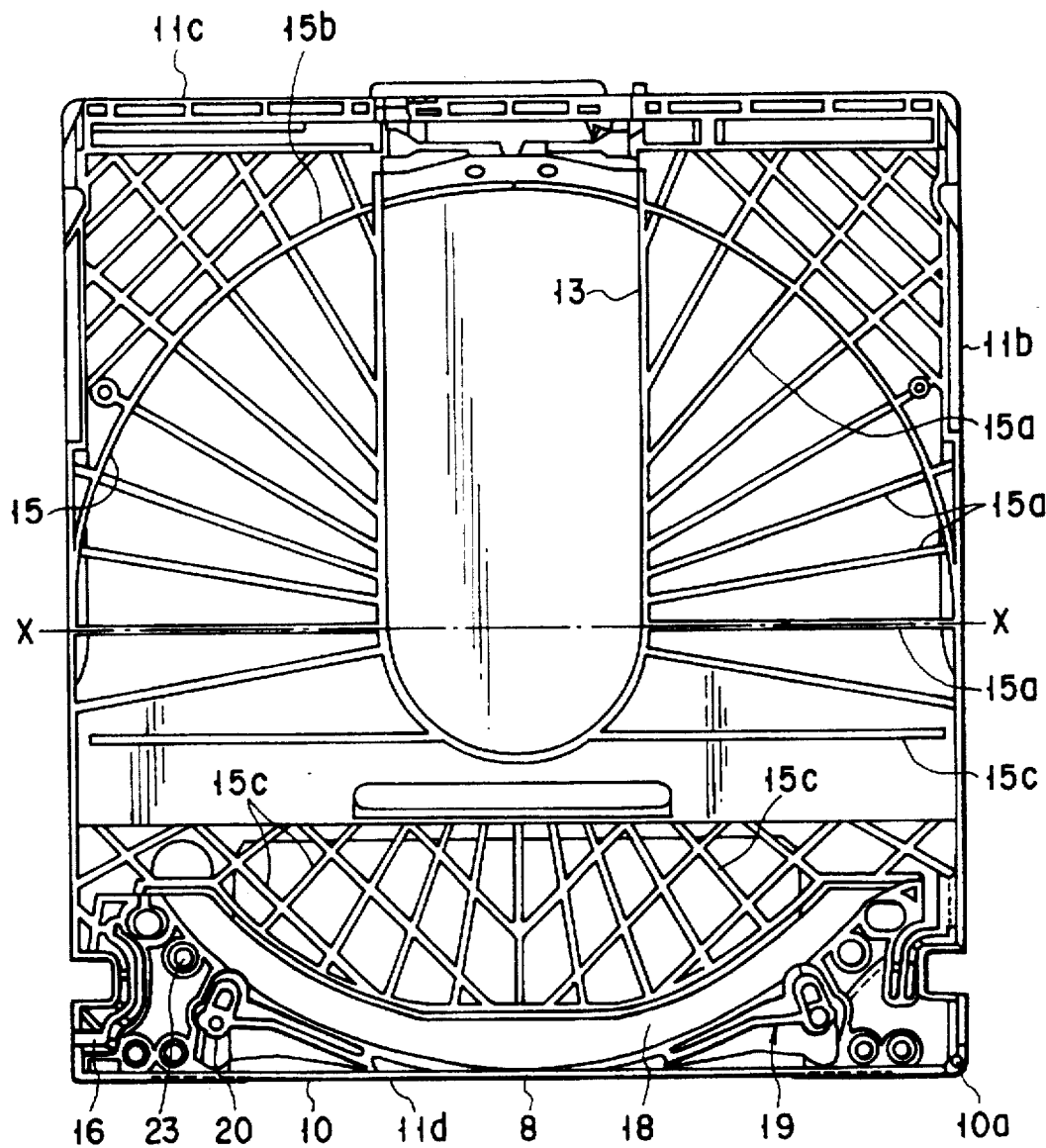
FIG. 3 is a plan view showing the lower case and the lid member of the disc cartridge.

As shown in FIGS. 3 to 5, on the inner surface of the lower casing 11b, a number of ribs 15a extending in the radial direction from the center of the lower casing corresponding to the center of the stored optical disc 12 and a rib 15b having an half-circle shape around the center of the lower casing as its center are provided in the region (or second region) between the center line X—X of the lower casing and the front end surface 11c. These ribs 15a are arranged at a predetermined interval in the circumferential direction around the center of the lower casing 11b. Each of the ribs 15a is shaped such that the height is increased gradually in the radial direction from the center of the lower casing 11b. The semi-circular rib 15b has a diameter slightly larger than that of the optical disc 12.

Meanwhile, as shown in FIGS. 3 and 6, on the inner surface of the lower casing 11b, a number of ribs 15c are formed within a region (or first region) between the center line X—X of the lower casing and the rear end surface 11d. These ribs 15c are formed such that the height of the ribs is low in the area of the center portion of the lower casing 11b and is high in the area of both end portions thereof as viewed in the widthwise direction of the lower casing 11b, i.e., in a direction parallel to the center line X—X.

Note that the upper casing 11a comprises ribs 15a, 15b, and 15c similar to those described above, and is formed in the same manner as the lower casing 11b. Therefore, the disc storing portion 15 of the cartridge body 11 which is formed by coupling the upper and lower casings is shaped such that this portion 15 is broad in the area of the center portion of the optical disc 12 and becomes narrower toward the outer circumference of the disc 12 in the front end half region (or the second region) of the cartridge body 11. With respect to the rear end half region (or the first region) of the cartridge body 11, the disc storing portion 15 has the smallest thickness dimension at both side end portions of the cartridge body and has the largest thickness dimension at the center portion between the both side end portions of the cartridge body. As a result of this, the optical disc 12 is contained in the disc storing portion 15, with only the outer peripheral portion supported, and only the outer peripheral portion contacts with the inner surface of the cartridge body 11 when the optical disc 12 passes through the disc inlet/outlet port 14.

Although the upper and lower casings 11a and 11b of the cartridge body 11 define the disc storing portion 15 and the disc inlet/outlet port 14 by means of a plurality of ribs 15a, 15b, and 15c, the same shapes as the storing portion 15 and the port 14 may be defined by the inner surfaces themselves of the casings without using ribs.

Figure 7:
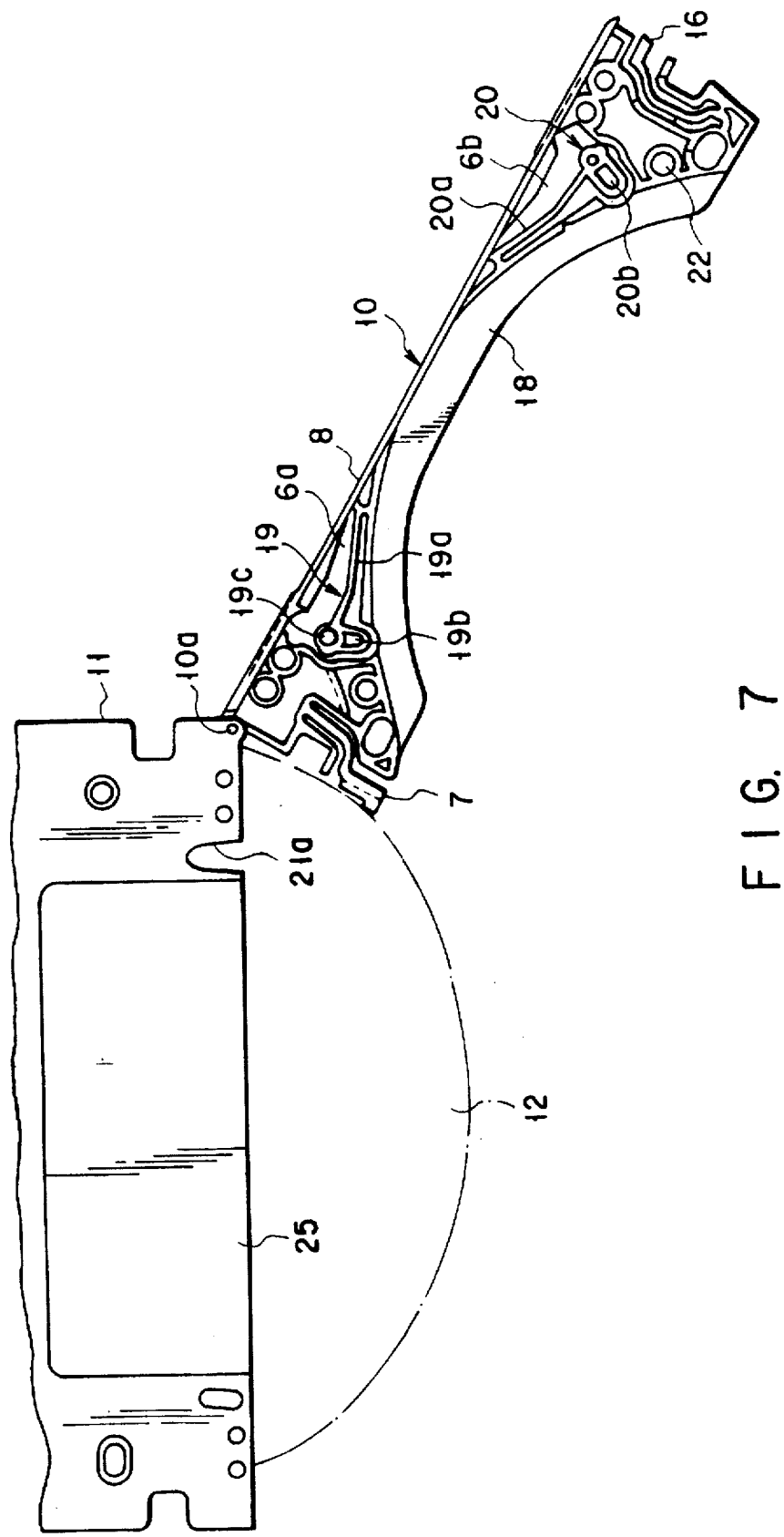
FIG. 7 is a top plan view showing the lid released.

As shown in FIGS. 2, 3, and 7, the lid 10 is shaped like a flat elongate plate which has a length substantially equal to the width of the cartridge body 11 and has a thickness which allows the lid to be fitted into the disc storing portion 15. A fringe 8 is formed at one side edge of the lid 10 and extends over the entire width of the cartridge body 11. This fringe 8 projects upwards and downwards from the lid 10 in the thickness direction of the cartridge body 11. The lid 10 is integrally formed with the lid 10 and is made of synthetic resin. Preferably, the fringe 8 is formed of synthetic resin of a color different from that of the cartridge body 11.

One end of the lid 10 is pivoted on a rear right corner portion of the cartridge body 11 by a pivot shaft 10a. Therefore, the lid 10 can be rotated in the arrow direction C-D around the pivot shaft 10a as shown in FIG. 2, thereby opening and closing the disc inlet/outlet port 14. When the lid 10 is rotated to a closed position, the lid 10 enters into the disc storing portion 15 through the disc inlet/outlet port 14, and the fringe 8 abuts against the rear end edges of the cartridge body 11, thereby closing the disc inlet/outlet port 14.

A free end portion of the lid 10, i.e., the end portion of the lid 10 which is opposite to the pivot shaft 10a is provided with a lock claw 16 which is elastically deformable. An engage hole 17 which can be engaged with the lock claw 16 is formed in the rear end portion of the left side wall of the cartridge body 11. Therefore, when the lid 10 is rotated to the position where the lid 10 closes the disc inlet/outlet port 14, the lock claw 16 is engaged with the engage hole 17, thereby locking the lid 10 to the closed position. Note that this locking can be released and the lid 10 can be opened, by pushing inwards the lock claw 16 through the engage hole 17 from the outside of the cartridge body 11.

Figure 8:
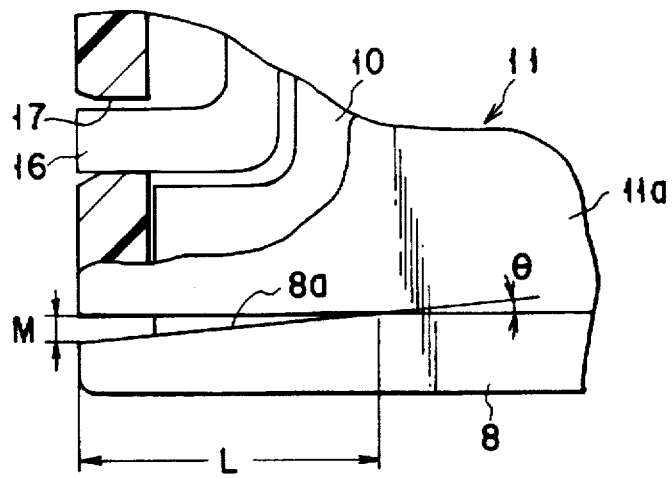
FIG. 8 is an enlarged plan view showing a free end side of the lid.

As shown in FIG. 8, at the free end portion of the lid 10, slanting surfaces 8a are formed on the fringe 8 such that a clearance M is formed between the fringe 8 and the rear end edges of the upper and lower casings 11a and 11b when the lid 10 is closed. Each of the slanting surfaces 8a extends outwards at a 100 angle from the point positioned apart from the free end of the fringe 8 by a length L. Thus, a clearance M of about 0.3 mm is obtained at the free end of the lid 10.

In the above structure, the lock claw 16 of the lid 10 and the engage hole 17 of the cartridge body 11 can be engaged with each other with a minimum margin to prevent backlash of the lid 10 in the closed position. Specifically, the lock claw 16 is positioned and formed in a manner such that the free end portion of the lid 10 is further pushed toward the rear end surface 11d side by the clearance M and is thus elastically deformed so that the lock claw 16 is engaged with the engage hole 17 after the lid 10 is rotated to the closed position to bring the portion of the fringe 8 other than the slanting surface 8a into contact with the rear end surface 11d of the cartridge body. Therefore, when the pushing force applied to the free end portion of the lid 10 is released after the lock claw 16 is engaged with the engage hole 17, the free end portion of the lid 10 generates an elastic force in the direction in which this free end portion is apart from the rear end surface 11d of the cartridge body 11 and the lock claw 16 is kept engaged with the engage hole 17 by this elastic force. Therefore, the lid 10 securely closes the disc inlet/outlet port 14 of the cartridge body 11 without backlashing.

Figure 9:
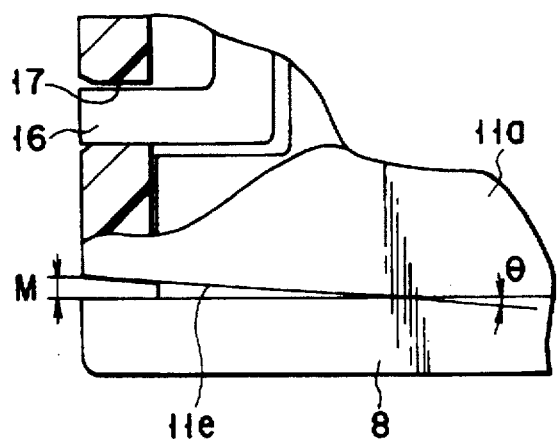
FIG. 9 is an enlarged plan view showing a modification of the lid member and the cartridge body.

The same function as described above can be obtained if slanting surfaces 11e are formed on the rear end surface 11d of the cartridge body 11, as shown in FIG. 9, in place of forming slanting surfaces 8a on the fringe 8 of the lid 10.

As shown in FIGS. 2, 3, and 7, the lid 10 is provided with an arc-like disc guide recess 18 in correspondence with the disc storing portion 15 of the cartridge body 11. When the lid 10 is closed, a part of the optical disc 12 is positioned in the disc guide recess 18. When the optical disc 12 stored in the disc storing portion 15 is removed from the cartridge body 11 through the disc inlet/outlet port 14 while the lid 10 is opened, the outer peripheral portion of the optical disc 12 is partially stored in the disc guide recess 18 and is thus prevented from suddenly or directly falling from the cartridge.

In addition, a stopper 7 having a claw-like shape which can be elastically deformed is provided at the end portion of the lid 10 in the side close to the pivot shaft 10a. This stopper 7 contacts the outer peripheral portion of the optical disc 12 and prevents the optical disc from suddenly falling when the lid 10 is partially opened and the optical disc 12 is extracted out of the cartridge body 11. As can be seen clearly from FIG. 7, when the lid 10 is fully opened to a position 180° from the closed position, the stopper 7 will not contact the disc 12 and the disc 12 may be freely removed from the cartridge.

As shown in FIGS. 2, 3, 7, and 1 0, first and second write protect operating portions 19 and 20 which are elastically deformable are integrally formed on the lid 10, so as to correspond to the surfaces A and B of the optical disc 12. For example, the first write protect operating portion 19 includes an arm portion 19a projecting from the substantial center portion of the lid 10 in the widthwise direction thereof toward the end portion of the lid 10 close to the pivot shaft 10a side, a sector portion 19b provided at the extended end of the arm portion 19a, and a switch operating element 19c projecting from the sector portion 19b toward the upper casing 11 a side. Further, the first write protect operating portion 19 is positioned in an opening 6a formed in the lid 10, and only the proximal end of the arm portion 19a is connected to the lid 10. As a result of this, the write protect operating portion 19 is thus rotatable in the opening 6a around the proximal end of the arm portion 19a as the rotational center.

The second write protect operating portion 20 is formed to be symmetrical to the first write protect operating portion 19 with respect to the center of the lid 10 in the widthwise direction thereof. Specifically, the second write protect operating portion 20 includes an arm portion 20a, a sector portion 20b provided at the extended end of the arm portion, and a switch operating element 20c (see FIG. 11C) projecting from the sector portion toward the lower casing 11b side. Further, the second write protect operating portion 20 is positioned in an opening 6b formed in the lid 10, and only the proximal end of the arm portion 20a is connected to the lid 10.

Meanwhile, in the vicinity of the pivot shaft 10a of the lid 10, a storing hole 21a is formed in the rear end portion of the upper casing 11 a and open to the rear end surface 11d. In the vicinity of the engage hole 17, another storing hole 21b is formed in the rear end portion of the lower casing 11b and open to the rear end surface 11d. Further, where the lid 10 is closed, the switch operating element 19c of the first write protect operating portion 19 and the switch operating element 20c of the second write protect operating portion 20 are respectively stored in the storing holes 21a and 21b, and the first and second write protect operating portions 19 and 20 can be actuated through the storing holes.

Upon assembling the disc cartridge, when the lid 10 is attached to the cartridge body 11 at the disc inlet/outlet port 14, the lid 10 is first mounted at a predetermined position on the lower casing 11b. In this case, the pivot shaft 10a integrally formed with the lid 10 is inserted into a hole (not shown) of the lower casing 11b, and the lid 10 is maintained at its closed position. In the next, the upper casing 11a is covered over the lid 10 and the lower casing 11b from the upside, such that the pivot shaft 10a of the lid 10 is inserted into a hole not shown of the upper casing. In this manner, the lid 10 is assembled between the upper and lower casings 11a and 11b and kept at the closed position.

Figure 11A:
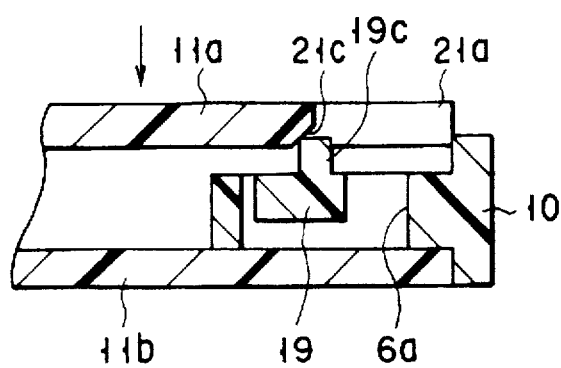
FIG. 11A and 11B are cross-sections schematically showing a step of positioning a first write-protect operating portion.
Figure 12A:
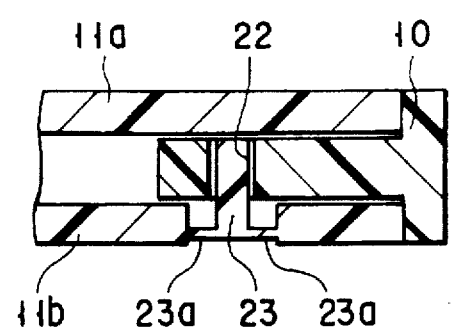
FIG. 12A is a cross-section showing an opening detect portion of the disc cartridge.
Figure 11B:
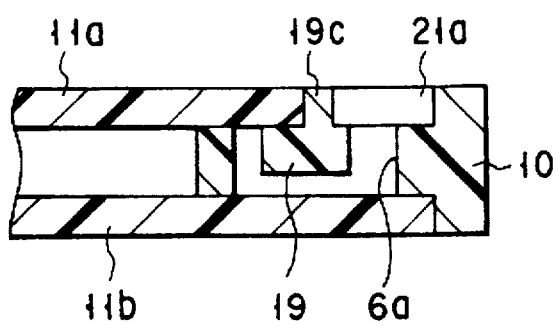
Figure 12B:
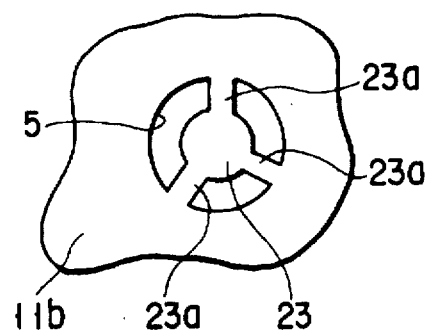
FIG. 12B is a plan view showing a detect pin portion of the opening detect portion.
Figure 11C:
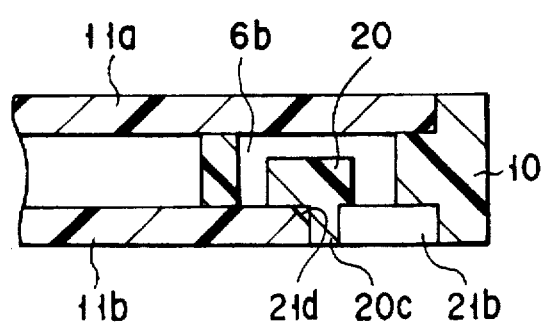
FIG. 11C is a cross-section schematically showing a step of positioning a second write-protect operating portion.

Here, as shown in FIGS. 11A and 11B, the storing hole 21 a formed in the upper casing 11a has a slanting surface 21c which is positioned in the bottom side of the storing hole 21a and in the inner surface side of the upper casing 11a and which functions as guide means. When the upper casing 11a is covered over the lower casing 11b, the switch operating element 19c of the first write protect operating portion 19 of the lid 10 is guided to the rear end surface side of the upper casing 11a along the slanting surface 21c of the storing hole 21a. At the time point where connection between both casings is completed (or in the state where assembling of both casings is completed), the switch operating element 19c is contained in the storing hole 21a, kept in contact with the bottom end of the storing hole 21a, and the first write protect operating portion 19 is positioned at a predetermined initial operating position.

Figure 10:
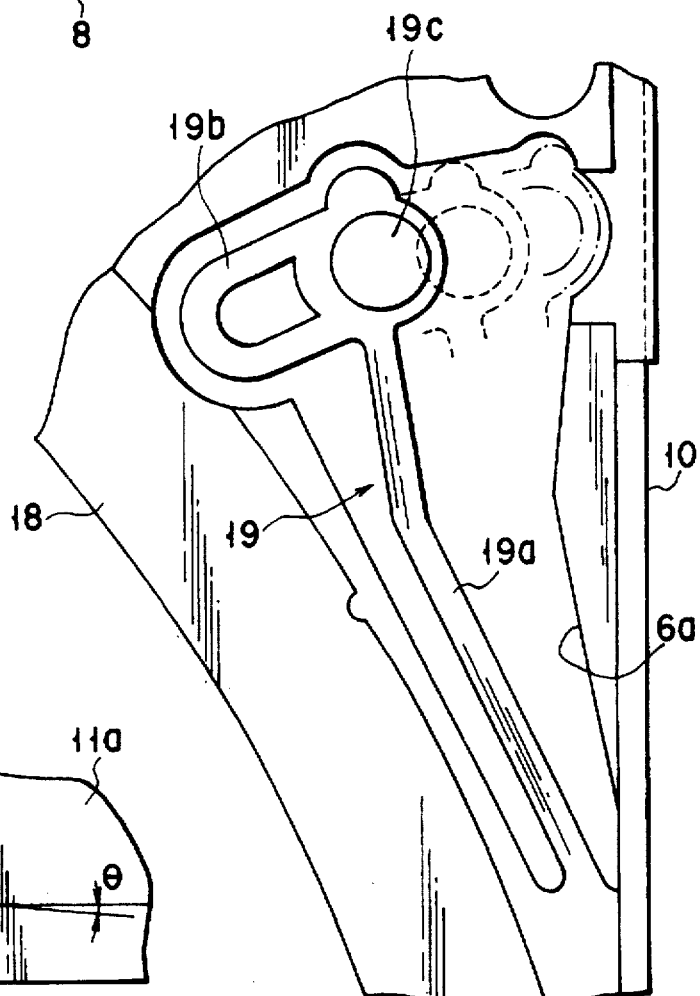
FIG. 10 is an enlarged plan view showing the write-protect portion of the lid.

Specifically, the first write protect operating portion 19 is in a molding position, indicated by a solid line in FIG. 10, in a state before the lid 10 is assembled into the cartridge body 11. Further, the first write protect operating portion 19 is automatically positioned at the initial operating position indicated by a broken line in FIG. 10 in a state in which the lid 10 is assembled in the cartridge body 11. Then, this first write protect operating portion 19 can be switched between the initial operating position (e.g., a write protect position) and a switched position (or a write allowable position) indicated by a dots and dashed line shown in FIG. 10. Note that the initial operating position may otherwise be set to a write allowable position while the switched position may be set to the write protect position.

Likewise, the second write protect operating portion 20 is positioned at an initial operating position such that the switch operating element 20c is guided along the slanting surface 21d of the storing hole 21b formed in the lower casing 11b and is brought into contact with the bottom end of the storing hole 21b. The operating portion 20 can be operated when connection between the upper casing 11a and the lower casing 11b is completed.

As shown in FIGS. 1 to 3, 7, 12A, and 12B, the disc cartridge comprises opening detect means for detecting whether the lid 10 is opened or closed.

Specifically, a through-hole 22 for detecting whether the lid 10 is opened or closed is formed in the vicinity of the free end of the lid 10, and extends in the direction perpendicular to the moving direction of the lid 10. In a state that the lid 10 is in the closed position, a detection pin 23 standing on the inner surface of the lower casing 11 b is inserted in the through-hole 22.

The proximal end portion of the detect pin 23 is positioned in a circular opening 5 formed in the lower casing 11b and is formed integrally with the lower casing 11b while being connected to the lower casing 11b through thin bridges 23a, so that the pin 23 can be easily bent and taken off from the lower casing 11b. The opening 5 is aligned with the through-hole 22 of the lid 10 in the closed position. Further the detect pin 23 is inserted into the through-hole 22 when attaching the lid 10 so as to corresponding to the disc inlet/outlet port 14 of the lower casing 11b while assembling the disc cartridge.

Before the lid 10 is opened for the first time after assembling the disc cartridge, the detect pin 23 is kept inserted in the through-hole 22 of the lid 10. Therefore, the through-hole 22 is closed by the detect pin 23, and cannot be used to detect whether or not the lid 10 has previously been opened.

If the lid 10 is rotated and opened in the arrow direction D around the pivot shaft 10a as the rotation center to extract the optical disc 12 from the cartridge body 11, the detect pin 23 is pushed by the lid 10 and is bent at the bridges 23a and taken off from the lower casing 11b, so that this pin 23 is removed out together with the lid 10 to the outside of the cartridge body 11. In addition, the circular opening 5 is formed as a mark of the detect pin 23 after this pin 23 is taken off. Therefore, when the lid 10 is closed again, the circular opening 5 of the lower casing 11 b and the through-hole 22 of the lid 10 are aligned with each other. Consequently, the through-hole 22 of the lid 10 can be detected through the opening 5.

If the lid 10 is thus opened from the disc inlet/outlet port 14 to a state in which the disc 12 can be extracted, the detect pin 23 of the lower casing 11b is removed, and as a result, it is possible to detect that the lid 10 has previously been opened, i.e., that the optical disc 12 has previously been extracted from the cartridge body 11. Note that the detect pin 23 may be provided on the upper casing 11a.

Figure 13:
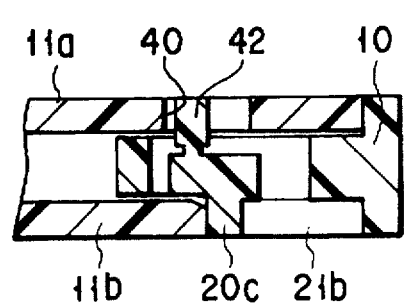
FIG. 13 is a cross-section showing a modification of the opening detect portion.

As shown in FIG. 13, the opening detect means may have another construction wherein a through-hole 40 for detecting whether the lid 10 is opened or closed is formed in the upper casing 11 a and a detect pin 42 which is engaged with the through-hole 40 and can be easily bent and removed may be provided on the lid 10, e.g., on the write protect operating portion 20, so that the detect pin 42 is bent and removed when the lid 10 is rotated and opened from the disc inlet/outlet port 14 of the cartridge body 11. In this manner, whether the through-hole 40 formed in the upper casing 11a is closed or opened is detected and whether or not the lid 10 has been previously opened is identified. In this case, the through-hole 40 used for detection may be formed in the lower casing 11b.

In this case, the through-hole 40 is formed to be elongated in the moving direction of the write protect operating portion 20 so that the write protect operating portion 20 can be switched and operated while the lid 10 is closed. In addition, the through-hole 40 and the detect pin 42 extend in a direction perpendicular to the moving direction of the lid 10.

In addition, the opening detect means may be constructed as shown in FIGS. 14A, 14B, and 15. Specifically, the lid 10 is provided with a write protect operating portion 30 which is movable in an arrow direction E-F. This write protect operating portion 30 is provided with a bent portion 31 through an elastic arm 31a, and the bent portion 31 is bent in a V-shaped form and can be elastically deformed through the elastic arm 31a. An operating element 30c is formed on the write protect operating portion 30. In addition, a position limit projection 32 which can abut against the bent portion 31 is projected on the inner surface of the upper casing 11 a. Further, when the lid 10 is disposed between the upper and lower casings 11a and 11b, the bent portion 31 is brought into contact with the position limit projection 32 and is installed as being bent by the position limit projection 32 against the elasticity of the bent portion 31 itself.

In the structure as described above, when the lid 10 is rotated in the arrow direction D shown in FIG. 1 with respect to the cartridge body 11, as has been described above, this lid 10 opens the disc inlet/outlet port 14 of the cartridge body 11 and, simultaneously, the bent portion 31 leaves the position limit projection 32. When the open lid 10 is rotated in the arrow direction C, thereby closing the disc inlet/outlet port 14 of the cartridge body 11, the corner portion side of the write protect operating portion 30 is brought into contact with the position limit portion 32, and is rotated in the counterclockwise direction by the position limit projection 32 in accordance with rotation of the lid 10. As a result of this, the write protect operating portion 30 is moved in the arrow direction E, and locked at the write protect position. Further, whether or not the lid 10 is opened from the disc inlet/outlet portion 14 is identified on the basis of the position of the write protect operating portion 30.

Figure 16:
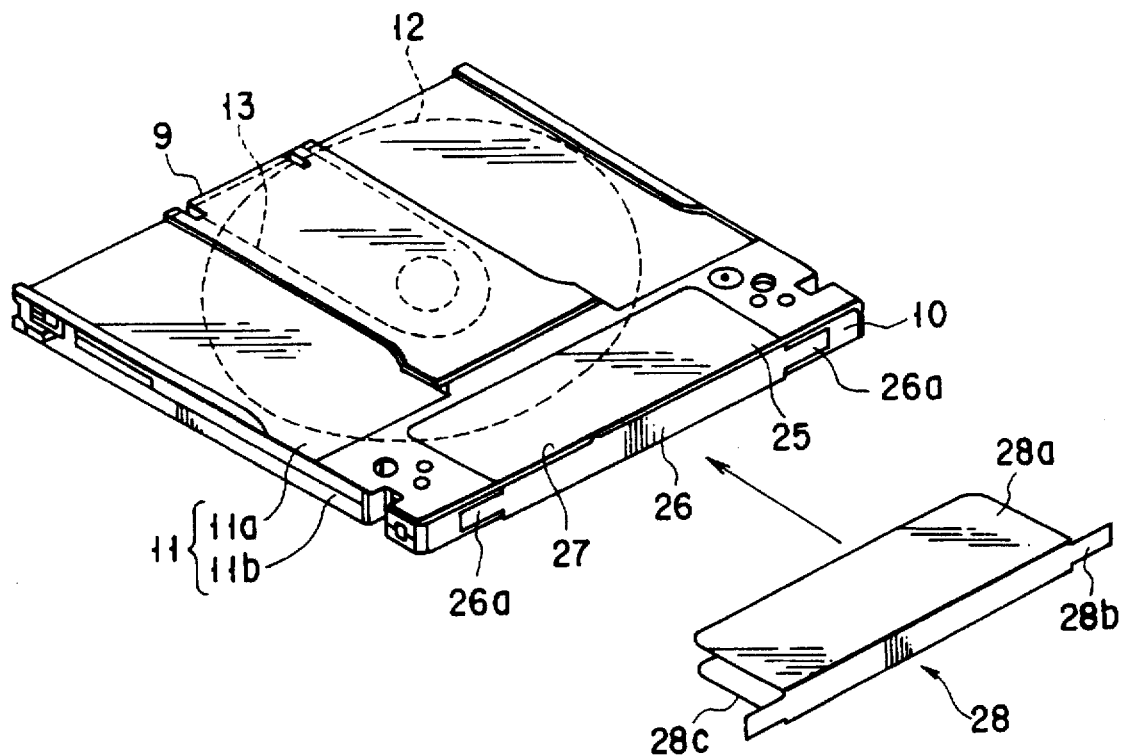
FIG. 16 is a perspective view showing the disc cartridge and an indication label applied thereto.
Figure 17:
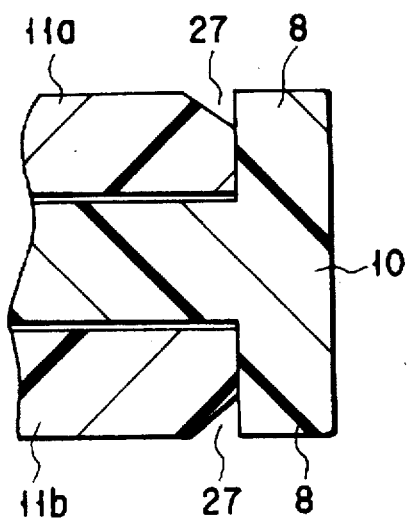
FIG. 17 is a cross-section showing a label separation groove of the cartridge body.

In the rear end portion of the cartridge body 11, as shown in FIGS. 1, 16, and 17, first label adhering portions 25 each having a rectangular concave shape and each recessed from the other portions are respectively formed in the main surfaces of the upper and lower casings 11a and 11b which are opposite to the optical disc 12. (For conveniences, FIG. 1 shows only one of the first label adhering portions 25 which is provided in the upper casing.) In addition, a second label adhering portion 26 having an elongated rectangular shape is formed on the outer surface of the lid 10 and is continuous to the first label adhering portions 25.

Concave position limit portions 26a projecting to both sides of the cartridge body 11 are respectively provided for both ends of the second label adhering portion 26. Further, label separation grooves 27 are formed on the rear end edges of the upper and lower casings 11a and 11b and extend along the boundaries between the first label adhering portions 25 and the second label adhering portion 26.

An indication label 28 having first to third rectangular indication surfaces 28a, 28b, and 28c is adhered on the first and second label adhering portions 25 and 26 of the cartridge body 11, as shown in FIG. 16. Among these indication surfaces, the second indication surface 28b is shaped so as to have a longer length dimension than the first and third indication surfaces 28a and 28c, and is positioned with respect to the second label adhering portion 26 in such a manner that three edges of each side projecting portion of the indication surface 28b are matched with the corresponding position limit portion 26a of the second label adhering portion 26. At the same time, the first and third indication surfaces 28a and 28c of the indication label 28 are adhered onto the first label adhering portions 25 such that the end portions of these surfaces respectively correspond to the end portions of the first label adhering portions 25 of the upper and lower casings 11a and 11b.

The position limit portions 26a of the second label adhering portion 26 may be formed such that the position limit portions 26a define at least two end edges of the indication surface 28b of the indication label 28.

Further, the indication label 28 thus adhered on the first and second label adhering portions 25 and 26 can be easily divided into first to third indication surfaces 28a to 28c by tracing the label along separate grooves 27 of the cartridge body 11 with use of a tool such as a pen or the like. Therefore, the indication label 28 adhered on the first and second label adhering portions 25 and 26 can easily be replaced partially in units of first to third indication surfaces 28a to 28c. As a result of this, when information in the optical disc 12 is over-written or so, the label can be easily replaced in such a manner in which replacement of a current indication label does not affects records on the current indication label.

The indication label 28 is adhered on a base sheet 33 with an adhesion applied on the back surface of the label, such that the label can be peeled off from the sheet, as shown in FIGS. 18A to 18D. In case of the indication label 28 shown in FIG. 18A, boundaries between first to third indication surfaces 28a to 28c are not processed. However, perforation-like cutting guide lines (FIG. 18B) may be formed at a predetermined distance maintained therebetween, or cutting guide lines (FIG. 18C) continuously extending in the width-wise direction to the middle area of the boundaries may be formed on the boundaries so that first to third indication surfaces can be separated from each other upon requests after the indication label 28 is adhered on the cartridge body 11. In this manner, handling ability of the label can be improved when adhering labels.

Figure 18A:
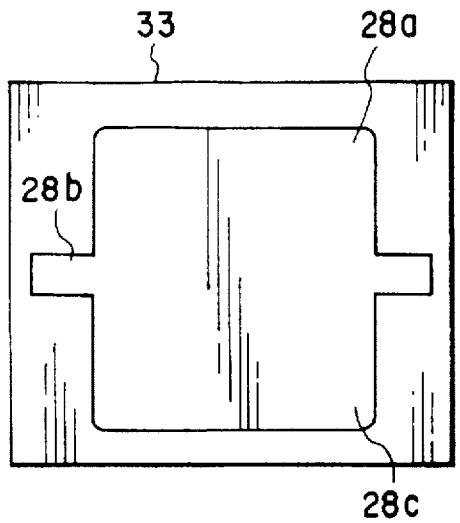
FIGS. 18A to 18D are plan views respectively showing different indication labels.
Figure 18B:
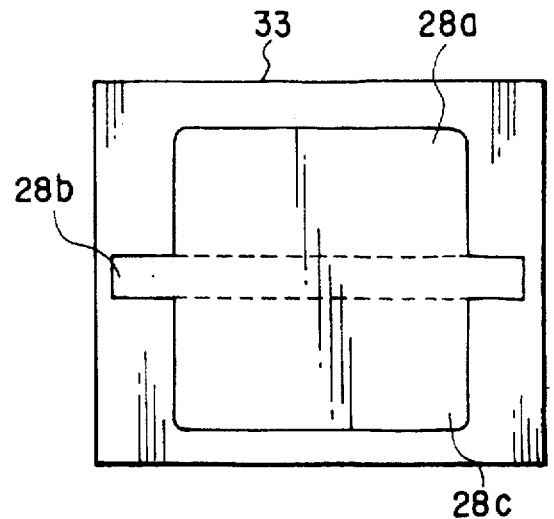
Figure 18C:
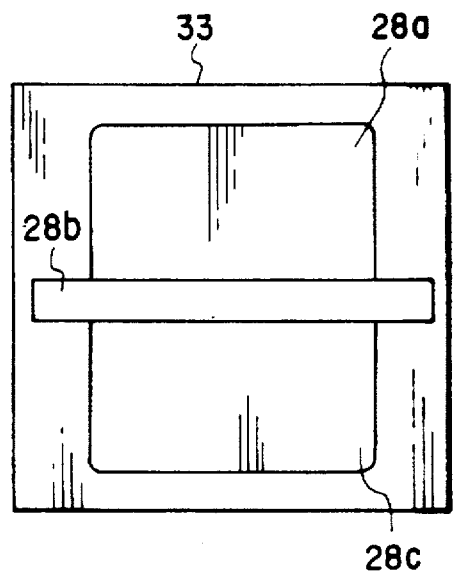
Figure 18D:
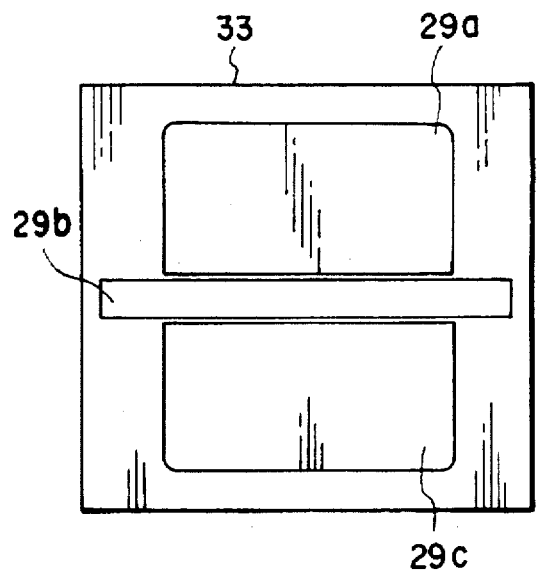
Figure 19:
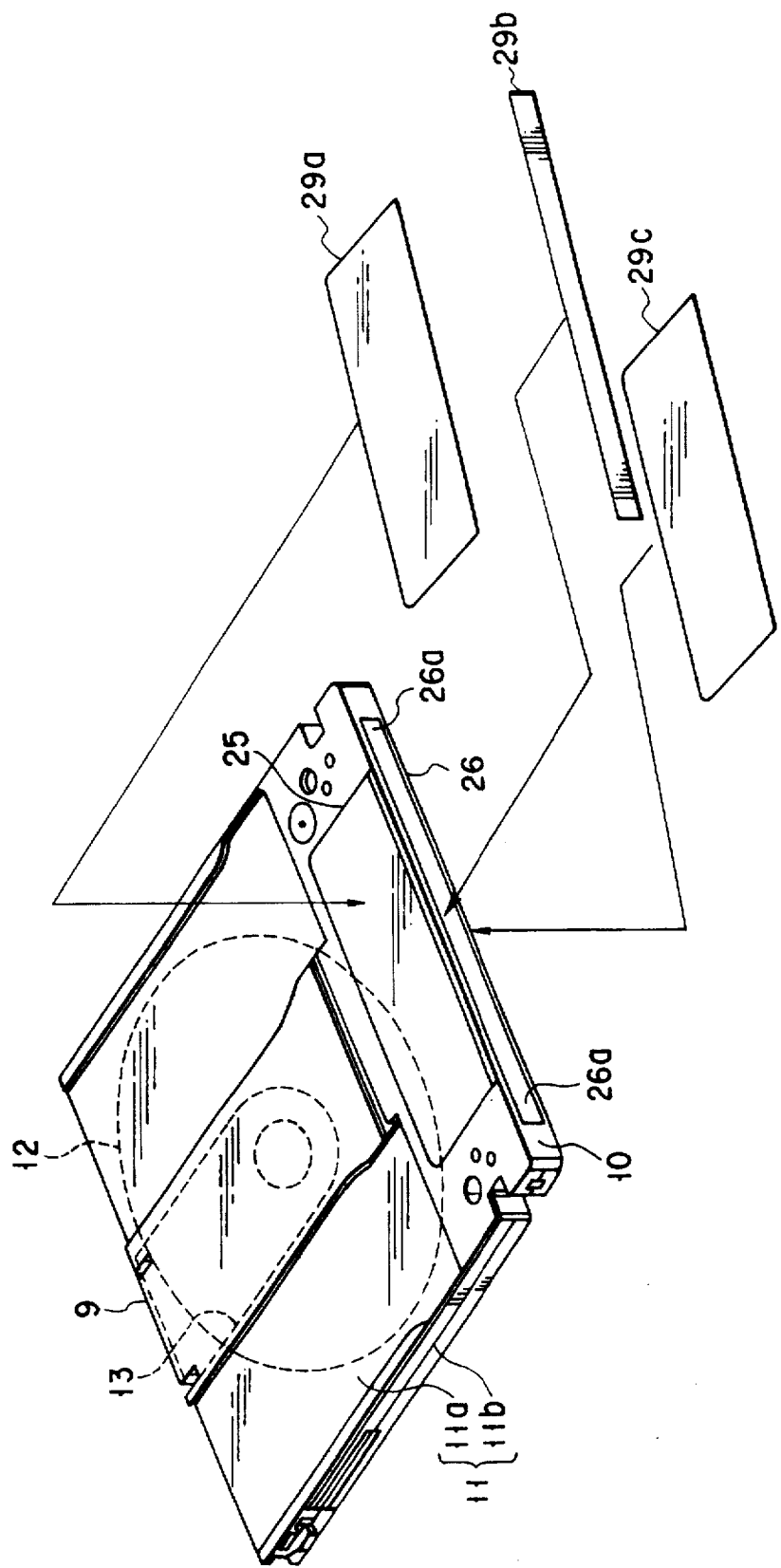
FIG. 19 is a perspective view showing the disc cartridge and another indication label applied thereto.

Otherwise, as shown in FIG. 19, indication labels 29a to 29c each having one single indication surface may be independently adhered on the first and second label adhering portions 25 and 26 of the cartridge. Then, the adhering area of the second label adhering portion 26 of the lid 10 in the rear end side of the cartridge body 11 can particularly be enlarged, so that the indication contents can achieve a high degree of freedom. In this case, the indication labels 29a to 29c are independently adhered on the base sheet, as shown in FIG. 18D.

When the disc cartridge constructed as described above is loaded into a disc recording/reproducing device (not shown) along the insert direction E shown in FIG. 1, the shutter 9 is slid toward an end side (to the left or right) at first by the shutter opening and closing means in the device, and the opening 13 is thereby opened. Then, a turn table (not shown) enters through the opening 13 into the cartridge body 11 to rotatably support the optical disc 12 while a pick-up faces one surface of the optical disc 12 through the opening 13.

In this state, the optical disc 12 is rotated by the turn-table, and information signals are recorded on and/or reproduced from the optical disc 12 by the pickup. To record information into the optical disc 12, the first or second write protect operating portion 19 or 20 must be previously set to the write allowable position as discussed above.

To extract the optical disc 12 from the cartridge body 11, the lock claw 16 of the lid 10 is pushed in, so as to leave the engage hole 17, and the lid 10 is rotated in the arrow direction D. Then, the disc 12 stored in the disc storing portion 15 of the cartridge body 11 is guided along the disc guide groove portion 18 of the lid 10, passing through the disc inlet/outlet port 14, so that extraction of the disc 12 is enabled. In this state, the lid 10 bends and removes away the open/close detect pin 23 provided in the lower casing 11b of the cartridge body 11 in association with its rotation, thereby indicating that the lid 10 has been opened so that the disc 12 can be extracted.

This lid 10 closes the disc inlet/outlet port 14 when the lid 10 is rotated in the arrow direction C from its open position. In this case, if the free end portion of the lid 10 is pushed until it eliminates the clearance M and abuts against the rear end surface 11d of the cartridge body 11, the lock claw 16 is elastically engaged with the engage hole 17, and the lid 10 securely closes the disc inlet/outlet port 14 while being kept in contact with the rear end surface 11d of the cartridge body 11 by the elastic force of the lid 10 itself.

According to the disc cartridge constructed as described above, the lid 10 for opening and closing the disc inlet/outlet port 14 of the cartridge body 11 is formed so as to integrally comprise first and second write-protect operating portions 19 and 20 which are elastically deformable. When the lid 10 is in the closed position with respect to the disc inlet/outlet port 14 of the cartridge body 11, the first and second write protect operating portions 19 and 20 can be freely operated from both sides of the cartridge body 11.

Further, the optical disc 12 contained in the cartridge body 11 can be taken into or taken out of the cartridge body 11 through the disc inlet/outlet port 14 as the lid 10 integrally provided with the first and second write protect operating portions 19 and 20 is opened and closed with respect to the cartridge body 11.

Therefore, when the optical disc 12 is contained in the cartridge body 11, the optical disc 12 can be used while ensuring the write protect function of the cartridge. Further, the optical disc 12 can be extracted from the cartridge and can be used by itself. As a result of this, two modes are available as methods of using the optical disc 12, and thus, the degree of freedom in use is improved in comparison with a conventional cartridge.

In addition, the first and second write protect operating portions 19 and 20 are integrally molded with the lid 10 with a predetermined margin maintained with respect to the lid 10. When the lid 10 is assembled in the disc inlet/outlet port 14 between the upper and lower casings 11a and 11b of the cartridge body 11, the first and second write protect operating portions 19 and 20 are positioned to predetermined initial operating positions. Therefore, when the lid 10 is shaped from resin with use of a mold, the precision of the molding of the first and second write protect operating portions 19 and 20 can be make relatively low. Thus, the precision of the mold can be reduced and it is possible to form the lid 10 in a simple and easy manner at a low price.

In addition, the write protect operating portions 19 and 20 are automatically guided to an initial operating position by the slanting surfaces 21c of the storing holes 21a and 21b of the upper and lower casings when the lid 10 is assembled to the upper and lower casings 11a and 11b of the cartridge body 11. Therefore, the lid 10 can easily be installed on the cartridge body 11, so that assembly operation can be simplified.

Further, according to the disc cartridge as described above, the lid 10 is of a color different from the cartridge body 11, and therefore, the direction in which the cartridge body should be loaded into a disc drive device can be easily identified, so that the cartridge body is effectively prevented from being loaded in a wrong manner.

Note that the present invention is not limited to the above-mentioned embodiment, but can be variously modified within the scope of the present invention. For example, the above explanation has been made to an embodiment applied to the optical disc 12 having data recording surfaces on both sides. However, the present invention is not limited thereto but can be applied to a disc which has a data recording surface on only one side. In this case, the write protect operating portion is provided for only one side of the cartridge body 11. In addition, the recording medium contained in the cartridge body is not limited to an optical disc, but any other kind of disc-like recording medium such as a magnetic disc, a magneto-optical disc, or the like is applicable.

What is claimed is:

1. A disc cartridge comprising:

a cartridge body for rotatably storing a disc-like recording medium, the cartridge body including a pair of walls main each facing opposite surfaces of the recording medium, an opening formed in at least one of the main walls for exposing a part of a surface of the recording medium, and a disc inlet/outlet port for insertion of the recording medium into the disc cartridge and removal of the recording medium from the disc cartridge;

a shutter slidably mounted on the cartridge body for opening and closing the opening; and a lid mounted on the cartridge body and rotatable between a closed position wherein the lid closes the disc inlet/outlet port and an opened position wherein the lid opens the disc inlet/outlet port;

wherein the lid includes a write protect operating portion movable between a write protect position preventing recording of information onto the recording medium and a write allow position allowing recording of information onto the recording medium, the write protect operating portion being arranged to be inserted into the cartridge body between the pair of main walls and operable from outside the cartridge body when the lid is in the closed position.

2. A disc cartridge according to claim 1, wherein the write protect operating portion is molded from resin and formed integrally with the lid.

3. A disc cartridge according to claim 2, wherein the cartridge body includes a guiding structure for guiding and positioning the write protect operating portion to a predetermined initial operating position from a molded position, when the lid is assembled in the cartridge body at the closed position.

4. A disc cartridge according to claim 3, wherein the write protect operating portion includes an elastically deformable arm portion which projects from the lid, a sector portion provided at an extended end of the arm portion, and a switch operating element projecting from the sector portion, the cartridge body includes a storing hole opened in an outer surface of the cartridge body and configured to receive the switch operating element, and the guiding structure includes a slanting surface formed on an inner surface of the cartridge body configured to engage the switch operating element and guide the write protect portion to the predetermined initial operating position in the storing hole when the lid is assembled into the cartridge body at the closed position.

5. A disc cartridge according to claim 1, wherein the lid is a different color then the cartridge body.

6. A disc cartridge according to claim 1, wherein the lid includes a stopper configured to engage the recording medium during removal of the recording medium through the disc inlet/outlet port when the lid is in a partially opened position, thereby preventing the recording medium from falling.

7. A disc cartridge comprising:

- a cartridge body for rotatably storing a disc-like recording medium having two recording surfaces disposed opposite one another, the cartridge body including a pair of main walls each facing one of the two recording surfaces of the recording medium, an opening on each main wall for exposing parts of the recording surfaces of the recording medium, and a disc inlet/outlet port for insertion of the recording medium into the disc cartridge and removal of the recording medium from the disc cartridge;
- a shutter slidably mounted on the cartridge body for opening and closing the openings; and
- a lid mounted on the cartridge body and rotatable between a closed position wherein the lid closes the disc inlet/outlet port and an opened position wherein the lid opens the disc inlet/outlet port;
- wherein the lid includes a first write protect operating portion movable between a write protect position preventing recording of information onto a first of the two recording surfaces of the recording medium and a write allow position allowing recording of information onto the first of the two recording surfaces and
- the lid includes a second write protect operating portion movable between a write protect position preventing recording of information onto a second of the two recording surfaces of the recording medium and a write allow position allowing recording of information onto the second of the two recording surfaces, the first and second write protect operating portions being arranged to be inserted into the cartridge body between the pair of main walls, and operable from outside the cartridge body when the lid is in the closed position.

\* \* \* \* \*